(12) United States Patent
Virtanen

(10) Patent No.: US 8,742,732 B2
(45) Date of Patent: Jun. 3, 2014

(54) CONTROL METHOD FOR DOUBLY-FED ELECTRIC GENERATOR

(75) Inventor: Reijo Kalevi Virtanen, Vantaa (FI)

(73) Assignee: ABB Oy, Helsinki (FI)

( * ) Notice: Subject to any disclaimer, the term of this patent is extended or adjusted under 35 U.S.C. 154(b) by 394 days.

(21) Appl. No.: 13/285,477

(22) Filed: Oct. 31, 2011

(65) Prior Publication Data

US 2012/0119712 A1  May 17, 2012

(30) Foreign Application Priority Data

Nov. 17, 2010 (EP) .................................... 10191518

(51) Int. Cl.
*H02P 11/00* (2006.01)

(52) U.S. Cl.
USPC .............................. 322/22; 290/44

(58) Field of Classification Search
USPC .................... 322/22, 23, 37; 290/44
See application file for complete search history.

(56) References Cited

U.S. PATENT DOCUMENTS

| | | | |
|---|---|---|---|
| 6,448,735 B1 | 9/2002 | Gokhale et al. | |
| 6,741,059 B2 * | 5/2004 | Gokhale et al. | ............... 318/700 |
| 7,755,209 B2 * | 7/2010 | Jones et al. | ..................... 290/44 |
| 8,067,847 B1 * | 11/2011 | Waszak et al. | .................. 290/44 |
| 8,294,288 B2 * | 10/2012 | Rivas et al. | ..................... 290/44 |
| 8,395,360 B2 * | 3/2013 | Tripathi et al. | ................. 322/29 |
| 8,415,818 B2 * | 4/2013 | Engelhardt et al. | ............ 290/44 |

OTHER PUBLICATIONS

Search Report issued on Jul. 18, 2011, by European Patent Office for Application No. 10191518.9.
Seman et al., "Ride-Through Analysis of Doubly Fed Induction Wind-Power Generator Under Unsymmetrical Network Disturbance", IEEE Transactions on Power Systems, Nov. 2006, pp. 1782-1789, vol. 21, No. 4.
Chen et al., "Integral Sliding-Mode Direct Torque Control of Doubly-Fed Induction Generators under Unbalanced Grid Voltage", IEEE Transactions on Energy Conversion, Jun. 2010, pp. 356-368, vol. 25, No. 2.
Zhou et al., "Operation of Grid-Connected DFIG Under Unbalanced Grid Voltage Condition", IEEE Transactions on Energy Conversion, Mar. 2009, pp. 240-246, vol. 24, No. 1.

\* cited by examiner

*Primary Examiner* — Nicholas Ponomarenko
(74) *Attorney, Agent, or Firm* — Buchanan Ingersoll & Rooney PC

(57) ABSTRACT

Exemplary embodiments provide a method of controlling a doubly-fed electric generator using a frequency converter having a torque and flux controller. The frequency converter is connected to a rotor of the generator. The frequency converter calculates a stator flux positive sequence component from a stator flux. A rotor flux amplitude reference and an estimated torque is then calculated by using the stator flux positive sequence component. The frequency converter selects a voltage vector to steer the rotor flux by using the rotor flux amplitude reference and the estimated torque.

13 Claims, 1 Drawing Sheet

CONTROL METHOD FOR DOUBLY-FED ELECTRIC GENERATOR

RELATED APPLICATION

This application claims priority under 35 U.S.C. §119 to European Patent Application No. 10191518.9 filed in Europe on Nov. 17, 2010, the entire content of which is hereby incorporated by reference in its entirety.

FIELD

The present invention relates to electric generators, such as doubly-fed electric generators, and to controlling a doubly fed electric generator connected to an un-balanced grid.

BACKGROUND INFORMATION

Doubly-fed electric machines have windings on both stationary and rotating parts, where both windings transfer significant power between a shaft and an electrical system. Doubly-fed machines are useful in applications that specify a varying speed of the machine's shaft for a fixed power system frequency. Doubly-fed generators are, for example, widely used in wind turbines.

A doubly-fed generator can include a frequency controller connected to a rotor circuit. As the power through the rotor windings depends on the slip frequency, a frequency converter can be rated according to a maximum power through the rotor windings. If a range for the slip frequency is limited, the maximum power through the rotor windings may be only a fraction of the total power generated by the generator.

One way to control a doubly-fed electric generator is to use a torque and flux controller, for example as disclosed in patent publication U.S. Pat. No. 6,448,735 B1. A torque and flux controller, such as a Direct Torque Control (DTC) controller, uses a determined torque and flux to choose one of eight voltage vectors, which, in the case of doubly fed generator, is used to steer the rotor flux.

One of the disadvantages associated with these controllers is that the grid supplied by the generator can be assumed to be balanced. In practice there are many situations when the grid is more or less unbalanced. For instance, asymmetry of the loads can cause unbalance. Abnormal system conditions, such as phase-to-ground, phase-to-phase and open-conductor faults, can also cause phase unbalance. Since the generator stator is directly connected to the grid, unbalance in grid voltage causes large oscillations in currents which, in turn, can complicate the control of the generator.

Specification of maximum ratings of a doubly-fed generator can be carried out based on a winding ratio of the stator and the rotor. For example, in wind turbine applications, the winding ratio can be 1:2.6, for example, and the nominal voltage for the stator is, for example, 690 V. When the generator is at a standstill and the slip frequency is 50 Hz, for example, the generator rotor and stator act as a transformer, and the rotor voltage is (2.6·690 V=) 1800 V, thus giving a voltage rating of 1800 V.

A magnitude of the rotor voltage is proportional to the slip frequency, so the operational range in doubly-fed generator applications can be restricted to ±30% of the nominal speed.

At nominal speed, the unbalance can cause oscillations, for example, at a frequency of 100 Hz, to the rotor voltage. Since the magnitude of the rotor voltage is proportional to the slip frequency, and since the slip frequency is now 100 Hz, the voltage magnitude on the stator side, caused by unbalance, has to be only half (345 V) of the nominal voltage in order for the rotor voltage to reach the limit of 1800 V. The voltage oscillations cause current spikes in the stator and rotor circuit, because the generator flux is not able to follow changes in the grid voltage.

In general, the unbalance can cause reduction in useful torque, mechanical damage to bearings and faster thermal aging through excessive heating. Prior art control methods operating based on an assumption that the grid is balanced can aggravate these problems.

SUMMARY

An exemplary method of controlling a doubly-fed electric generator with a frequency converter including a torque and flux controller, which frequency converter is connected to a rotor of the generator is disclosed. The method comprising: determining a rotor flux; determining a stator flux; calculating a stator flux positive sequence component from the stator flux; calculating a rotor flux amplitude reference by using the stator flux positive sequence component; calculating a rotor flux error from the rotor flux amplitude reference and the rotor flux; converting the stator flux positive sequence component from a stator reference frame to a rotor reference frame; calculating an estimated torque by using the stator flux positive sequence component in the rotor reference frame; calculating a torque error from the estimated torque and a torque reference; and selecting a voltage vector by using the rotor flux, the torque error and the rotor flux error.

An exemplary frequency converter is disclosed. The frequency converter comprising: means for determining a rotor flux; means for determining a stator flux; means for calculating a stator flux positive sequence component from the stator flux; means for calculating a rotor flux amplitude reference by using the stator flux positive sequence component; means for calculating a rotor flux error from the rotor flux amplitude reference and the rotor flux; means for converting the stator flux positive sequence component from a stator reference frame to a rotor reference frame; means for calculating an estimated torque by using the stator flux positive sequence component in the rotor reference frame; means for calculating a torque error from the estimated torque and a torque reference; and means for selecting a voltage vector by using the rotor flux, the torque error, and the rotor flux error.

An exemplary method of controlling a doubly-fed electric generator with a frequency converter connected to a rotor of the generator is disclosed. The method comprising: calculating a stator flux positive sequence component from a stator flux of the generator; calculating a rotor flux amplitude reference by using the stator flux positive sequence component; calculating a rotor flux error from the rotor flux amplitude reference and a rotor flux of the generator; converting the stator flux positive sequence component from a stator reference frame to a rotor reference frame; calculating an estimated torque using the stator flux positive sequence component in the rotor reference frame; calculating a torque error from the estimated torque and a torque reference; and selecting a voltage vector using the rotor flux, the torque error and the rotor flux error.

BRIEF DESCRIPTION OF THE DRAWINGS

In the following the invention will be described in greater detail by means of preferred embodiments with reference to the accompanying drawings, in which.

DETAILED DESCRIPTION

Figure 1:
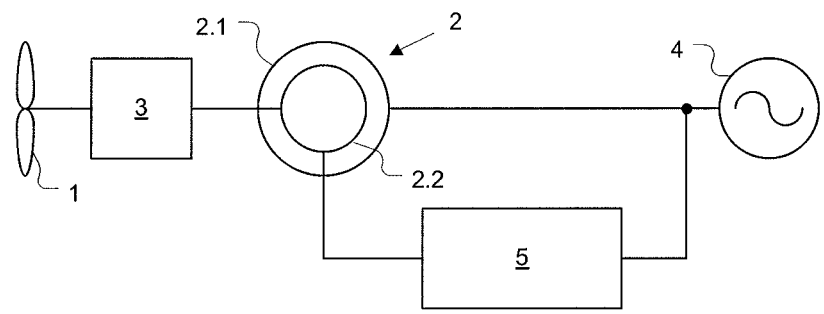
FIG. 1 illustrates a block diagram of a wind turbine in accordance with an exemplary embodiment of the present disclosure.

Exemplary embodiments of the present disclosure are directed to providing a method and an apparatus for dividing the grid voltage into symmetrical positive and negative sequence components and using the positive sequence to control the doubly-fed generator. The positive sequence is balanced and shows no oscillations caused by unbalance.

The exemplary embodiments disclosed herein provide advantages over known methods and systems, such as real and reactive power of the grid being controlled even if the grid is unbalanced. Power companies are increasingly interested in controlling the reactive current in an unbalanced grid.

Known 3-phase power systems include three components of equal magnitude and a 120° phase shift between each of the phases. This power system can be called balanced or symmetrical. The analysis of grid unbalance or asymmetry is based on a method of symmetrical components. Power companies can use a symmetrical component method in their grid code analysis for the power system. In the symmetrical component method, the grid voltage is divided into symmetrical positive and negative sequence components.

The positive sequence component is in the same phase sequence as that of the motor current. All its three phases are equal in magnitude and are equally separated by a 120° phase shift. The positive sequence component represents the amount of balance in the power system and consequently is instrumental in delivering useful power.

The negative sequence component has a phase sequence opposite to that of the motor current, hence the name negative sequence. It represents the amount of unbalance in the power system. All its three phases are equal in magnitude and are equally separated by a 120° phase shift. This component does not produce useful power. By being present, the negative sequence component contributes to the losses and causes a temperature rise. Negative-sequence currents produce a counter-rotating magnetic-field with respect to the main field. The field, rotating at double-frequency, causes undesirable eddy-currents to flow in various structures.

An exemplary method of the present disclosure alleviates the problems caused by unbalance in the grid by using the positive sequence component of a stator. The method, for instance, can be used for controlling, by using a torque and flux controller, arrangements including a doubly-fed electric generator and a frequency converter connected to a rotor of the generator. Real and reactive power of the grid can be controlled even if the grid is unbalanced.

An exemplary method of the present disclosure includes steps of determining a rotor flux and a stator flux. The exemplary method, for instance, can also include determining a rotor current, a rotor voltage, a stator current, and a stator voltage. From these determinations, rotor flux can be calculated from the rotor current and the rotor voltage, and the stator flux can be calculated from the stator current and the stator voltage.

Next, a stator flux positive sequence component can be calculated from the stator flux. The symmetrical components method principles are used in the positive sequence component calculation. Unlike the stator flux including the negative sequence component, the stator flux positive sequence component follows a circle and its magnitude is not affected by unbalance.

The stator flux positive sequence component can be used to calculate a rotor flux amplitude reference. The rotor flux amplitude reference, together with the rotor flux amplitude, can be used in the torque and flux controller. In the torque and flux controller, a rotor flux error is calculated from the rotor flux amplitude reference and the rotor flux.

To calculate an estimated torque, the stator flux positive sequence component can be converted from a stator reference frame to a rotor reference frame. The estimated torque can be calculated using the stator flux positive sequence component in the rotor reference frame. The estimated torque, for example, can be calculated from a cross-product of the stator flux positive sequence component in the rotor reference frame and the rotor flux.

A torque error can be calculated in the torque and flux controller based on the estimated torque and a torque reference. The torque error together with the rotor flux error is used to select a voltage vector.

FIG. 1 illustrates a block diagram of a wind turbine in accordance with an exemplary embodiment of the present disclosure. The wind turbine includes wind turbine rotor blades 1, which are connected to a doubly-fed generator 2 through a gear box 3. A generator stator 2.1 is connected to a grid 4. A frequency converter 5 is connected to a rotor 2.2 of the generator 2 and to the grid 4. The frequency converter 5 includes an inverter which is used to control the rotor 2.2 flux.

Figure 2:
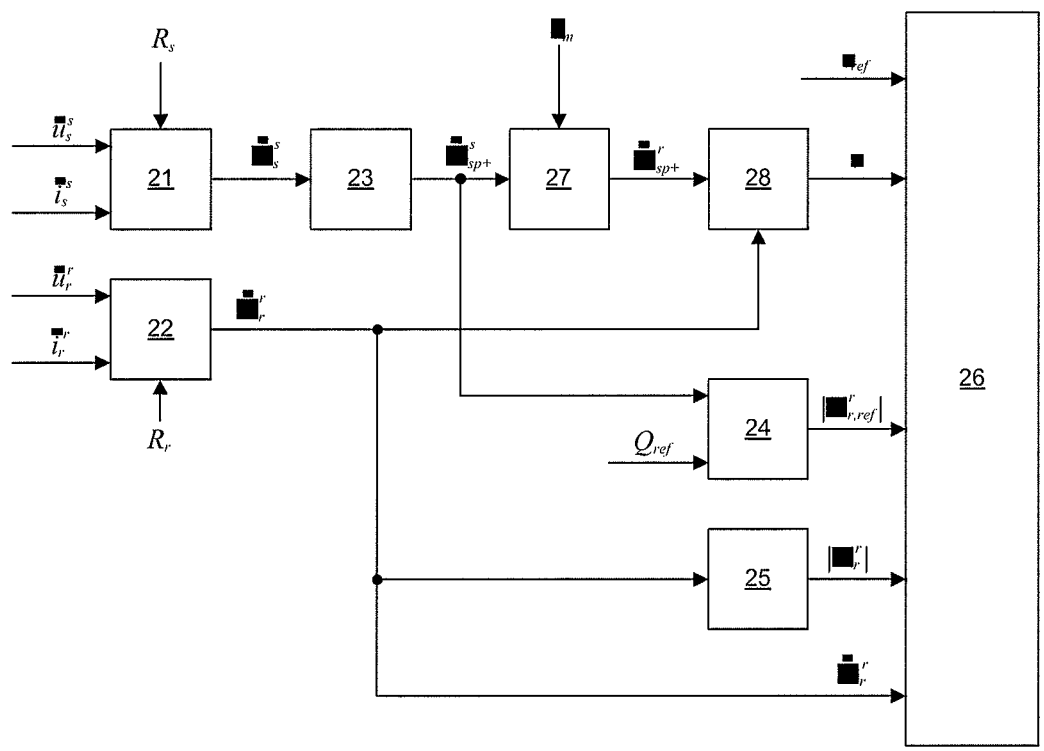
FIG. 2 illustrates a block diagram of a system in accordance with an exemplary embodiment of the present disclosure.

FIG. 2 illustrates a block diagram of a system in accordance with an exemplary embodiment of the present disclosure. First, a rotor current $\vec{i}_r^r$, a rotor voltage $\vec{u}_r^r$, a stator current $\vec{i}_s^s$, and a stator voltage $\vec{u}_s^s$ are determined. Means 21 and 22 can be used to calculate a rotor flux $\vec{\Psi}_r^r$ and a stator flux $\vec{\Psi}_s^s$, by using equations:

$$\vec{\Psi}_s^s = \int (\vec{u}_s^s - R_s \vec{i}_s^s) dt$$

$$\vec{\Psi}_r^r = \int (\vec{u}_r^r - R_r \vec{i}_r^r) dt, \qquad (1)$$

where $R_s$ and $R_r$ are stator and rotor winding resistances, respectively.

The exemplary embodiment can also include means 23 for calculating a stator flux positive sequence component $\vec{\Psi}_{sp+}^s$ from the stator flux. The stator flux positive sequence component can be extracted from the stator flux using known methods. For example, the positive sequence component can be determined by using a low-pass filter to filter stator flux components in synchronous coordinates.

The stator flux positive sequence component $\vec{\Psi}_{sp+}^s$ is used in means 24 to calculate a rotor flux amplitude reference $|\Psi_{r,ref}^r|$, which is later used in the torque and flux controller. The rotor flux amplitude reference is calculated from the amplitude of the stator flux positive sequence component $\vec{\Psi}_{sp+}^s$ and a reactive power reference $Q_{ref}$. A rotor flux amplitude $|\Psi_r^r|$ is calculated by means 25.

The rotor flux amplitude reference $|\Psi_{r,ref}^r|$, together with the rotor flux amplitude $|\Psi_r^r|$, is later used in a torque and flux controller 26. In the torque and flux controller 26, a rotor flux error is calculated from the rotor flux amplitude reference $|\Psi_{r,ref}^r|$ and the rotor flux $|\Psi_r^r|$.

The exemplary embodiment can include means 27, which are used to convert the stator flux positive sequence component $\vec{\Psi}_{sp+}^s$ from the stator reference frame to the rotor reference frame by multiplying the stator flux positive component in the stator reference frame by $e^{-j\theta_m}$, where $\theta_m$ is a rotor angle in respect of the stator. The result is a positive sequence component $\vec{\Psi}_{sp+}^{r}$ in the rotor reference frame. The rotor angle $\theta_m$ may, for instance, be determined by using a rotational speed sensor.

An estimated torque τ is then calculated, by means 28, as a cross product of the rotor flux $\vec{\Psi}_r^{r}$ and the stator flux positive sequence component $\vec{\Psi}_{sp+}^{s}$ in the rotor reference frame. A torque error is then calculated in the torque and flux controller based on the estimated torque τ and a torque reference $\tau_{ref}$. The torque error, together with the rotor flux error and rotor flux, is used to select a voltage vector in order to steer the rotor flux.

It will be obvious to a person skilled in the art that, as technology advances, the inventive concept can be implemented in various ways. The invention and its embodiments are not limited to the examples described above but may vary within the scope of the claims.

What is claimed is:

1. A method of controlling a doubly-fed electric generator with a frequency converter including a torque and flux controller, which frequency converter is connected to a rotor of the generator, wherein the method comprising:
    determining a rotor flux;
    determining a stator flux;
    calculating a stator flux positive sequence component from the stator flux;
    calculating a rotor flux amplitude reference by using the stator flux positive sequence component;
    calculating a rotor flux error from the rotor flux amplitude reference and the rotor flux;
    converting the stator flux positive sequence component from a stator reference frame to a rotor reference frame;
    calculating an estimated torque by using the stator flux positive sequence component in the rotor reference frame;
    calculating a torque error from the estimated torque and a torque reference; and
    selecting a voltage vector by using the rotor flux, the torque error and the rotor flux error.

2. The method according to claim 1, wherein the generator is part of a wind turbine.

3. The method according to claim 1, wherein the rotor flux amplitude reference is calculated from the amplitude of the stator flux positive sequence component and a reactive power reference.

4. The method according to claim 1, wherein the stator flux positive component is converted from the stator reference frame to the rotor reference frame by multiplying the stator flux positive component in the stator reference frame by $e^{-j\theta_m}$, where $\theta_m$ is a rotor angle in respect of the stator.

5. The method according to claim 4, wherein the rotor angle $\theta_m$ is determined by using a rotational speed sensor.

6. The method according to claim 1, wherein the estimated torque is calculated as a cross product of the rotor flux and the stator flux positive sequence component in the rotor reference frame.

7. A frequency converter comprising:
    means for determining a rotor flux;
    means for determining a stator flux;
    means for calculating a stator flux positive sequence component from the stator flux;
    means for calculating a rotor flux amplitude reference using the stator flux positive sequence component;
    means for calculating a rotor flux error from the rotor flux amplitude reference and the rotor flux;
    means for converting the stator flux positive sequence component from a stator reference frame to a rotor reference frame;
    means for calculating an estimated torque by using the stator flux positive sequence component in the rotor reference frame;
    means for calculating a torque error from the estimated torque and a torque reference; and
    means for selecting a voltage vector by using the rotor flux, the torque error, and the rotor flux error.

8. A method of controlling a doubly-fed electric generator with a frequency converter connected to a rotor of the generator, wherein the method comprising:
    calculating a stator flux positive sequence component from a stator flux of the generator;
    calculating a rotor flux amplitude reference by using the stator flux positive sequence component;
    calculating a rotor flux error from the rotor flux amplitude reference and a rotor flux of the generator;
    converting the stator flux positive sequence component from a stator reference frame to a rotor reference frame;
    calculating an estimated torque using the stator flux positive sequence component in the rotor reference frame;
    calculating a torque error from the estimated torque and a torque reference; and
    selecting a voltage vector using the rotor flux, the torque error and the rotor flux error.

9. The method according to claim 8, wherein the generator is part of a wind turbine.

10. The method according to claim 8, wherein the rotor flux amplitude reference is calculated from the amplitude of the stator flux positive sequence component and a reactive power reference.

11. The method according to claim 8, wherein the stator flux positive component is converted from the stator reference frame to the rotor reference frame by multiplying the stator flux positive component in the stator reference frame by $e^{-j\theta_m}$, where $\theta_m$ is a rotor angle in respect of the stator.

12. The method according to claim 11, wherein the rotor angle $\theta_m$ is determined by using a rotational speed sensor.

13. The method according to claim 8, wherein the estimated torque is calculated as a cross product of the rotor flux and the stator flux positive sequence component in the rotor reference frame.

* * * * *